United States Patent
Ito et al.

(10) Patent No.: US 12,429,090 B2
(45) Date of Patent: Sep. 30, 2025

(54) GAS RESTRICTION STRUCTURE CONSTITUTING AEROSTATIC BEARING, AND AEROSTATIC BEARING

(71) Applicant: OILES CORPORATION, Fujisawa (JP)

(72) Inventors: Akihiko Ito, Fujisawa (JP); Hirotsugu Tomita, Fujisawa (JP)

(73) Assignee: Oiles Corporation, Fujisawa (JP)

( * ) Notice: Subject to any disclaimer, the term of this patent is extended or adjusted under 35 U.S.C. 154(b) by 97 days.

(21) Appl. No.: 18/691,801

(22) PCT Filed: May 12, 2022

(86) PCT No.: PCT/JP2022/020123
§ 371 (c)(1),
(2) Date: Mar. 13, 2024

(87) PCT Pub. No.: WO2023/042480
PCT Pub. Date: Mar. 23, 2023

(65) Prior Publication Data
US 2024/0384756 A1    Nov. 21, 2024

(30) Foreign Application Priority Data
Sep. 15, 2021  (JP) .................. 2021-150405

(51) Int. Cl.
*F16C 32/06*    (2006.01)
*F16C 29/02*    (2006.01)

(52) U.S. Cl.
CPC ........ *F16C 32/0622* (2013.01); *F16C 29/025* (2013.01)

(58) Field of Classification Search
CPC .......................... F16C 29/025; F16C 32/0622; F16C 32/0651; F16C 32/0659
See application file for complete search history.

(56) References Cited

U.S. PATENT DOCUMENTS

| | | | | |
|---|---|---|---|---|
| 4,474,483 A | * | 10/1984 | Suzuki | F16C 32/0685 384/114 |
| 2014/0314345 A1 | * | 10/2014 | Ebl | F16C 32/0618 384/12 |
| 2017/0284464 A1 | * | 10/2017 | Suzuki | F16C 29/025 |

FOREIGN PATENT DOCUMENTS

| | | |
|---|---|---|
| JP | 50-5414 81 | 3/1975 |
| JP | 51-26455 Y1 | 7/1976 |

(Continued)

OTHER PUBLICATIONS

International Search Report issued in International Application No. PCT/JP2022/020123, dated Jul. 19, 2022.

*Primary Examiner* — Alan B Waits
(74) *Attorney, Agent, or Firm* — Knobbe, Martens, Olson & Bear, LLP (57) ABSTRACT

Proposed are a gas restriction structure constituting an aerostatic bearing configured to eject a gas obliquely from an ejection port end of a pocket hole part, while reducing an area of the restrictor, and an aerostatic bearing. A gas restriction structure used for an aerostatic bearing made of a single base material and configured to eject a compressed air for supporting a collar in a non-contact state may include a gas flow passage part communicating with a gas supply source for supplying the compressed air. The structure may also include a pocket hole part in which an ejection port end configured to communicate with an outlet end of the gas flow passage part faces the collar. A part of the pocket hole part and a part of the gas flow passage part overlap with each other as seen from an ejection port end side of the pocket hole part.

4 Claims, 4 Drawing Sheets

(56) References Cited

FOREIGN PATENT DOCUMENTS

| | | | |
|---|---|---|---|
| JP | 2005-282635 | A | 10/2005 |
| JP | 2006-052794 | A | 2/2006 |
| JP | 2011-185284 | A | 9/2011 |

* cited by examiner

GAS RESTRICTION STRUCTURE CONSTITUTING AEROSTATIC BEARING, AND AEROSTATIC BEARING

TECHNICAL FIELD

The present invention relates to a gas restriction structure which constitutes an aerostatic bearing, and an aerostatic bearing.

BACKGROUND ART

An aerostatic bearing for supporting an object to be supported by means of a pressure of a pressurized fluid introduced from the outside into the inside of the bearing is configured such that a part called restrictor which serves as a resistance to a gas flow is provided near and upstream of a gap (bearing gap) between the object to be supported and the aerostatic bearing.

Providing the aerostatic bearing with the restrictor allows a pressure of a gas (gas membrane) filling the entirety of the bearing gap to increase when the bearing gap reduces and allows a pressure of the gas membrane in the bearing gap to decrease when the bearing gap widens, so that the object to be supported can be held while floating from the aerostatic bearing at a position at which a load applied to the aerostatic bearing and a pressure of the gas membrane in the bearing gap are balanced with each other.

As a gas restriction structure constituting such an aerostatic bearing, an orifice-type restrictor using an orifice is conventionally known (for example, patent literature 1).

An aerostatic bearing using an orifice-type restrictor is configured such that a gas entering from an inlet passage is once restricted at an orifice, flows into a space called pocket between the orifice and a bearing gap, and then flows from the pocket into the gas bearing so as to support an axis.

PRIOR ART DOCUMENT

Patent Literature

Patent Literature 1: JP2005-282635A (in particular, FIG. 1)

SUMMARY OF INVENTION

Technical Problem

In the aerostatic bearing as described above, in general, the smaller an area of the restrictor is, then the smaller a required flow rate is and the larger a rigidity as a bearing (fluctuations of a load capacity (sum total of pressures within the bearing) in relation to fluctuations of the bearing gap) is, which is preferable.

Further, in recent years, along with the miniaturization of the entirety of a device, the miniaturization of a bearing has been also demanded, and accordingly the miniaturization of a restrictor is necessary.

However, a restrictor is manufactured by means of hole drilling using a cutting tool, laser, or the like, while the refinement of a tool diameter or a laser diameter has its limits, and thus the miniaturization of a restrictor using hole drilling is difficult and there still remains a room for further improvement in performance enhancement for an aerostatic bearing.

Moreover, an aerostatic bearing is typically configured such that a gas is ejected substantially vertically with respect to a bearing surface of the aerostatic bearing which faces an object to be supported, so that the object to be supported can be merely supported in a non-contact state and the object to be supported cannot be moved.

Then, to move the object to be supported while supporting the same in a non-contact state, it is also possible to eject a gas obliquely with respect to the bearing surface, thereby not only supporting the object to be supported in a non-contact manner but also moving the object to be supported along the bearing surface, whereas it is difficult to directly form a restrictor obliquely with respect to the bearing surface by means of hole drilling while maintaining processing precision in micron scale.

Thus, the present invention is to solve the problem in the conventional technology as described above, and accordingly it is an object of the present invention to provide a gas restriction structure constituting an aerostatic bearing configured to eject a gas obliquely from an ejection port end of a pocket hole part, while reducing an area of the restrictor, and to provide an aerostatic bearing.

Solution to Problem

The invention according to claim 1 is to solve the above problem by a gas restriction structure which constitutes an aerostatic bearing made of a single base material and configured to support an object to be supported in a non-contact state by ejecting a gas, the gas restriction structure including: a gas flow passage part configured to communicate with a gas supply source for supplying the gas; and a pocket hole part in which an ejection port end configured to communicate with an outlet end of the gas flow passage part faces the object to be supported, wherein a part of the pocket hole part and a part of the gas flow passage part overlap with each other as seen from an ejection port end side of the pocket hole part, and a center axis of the gas flow passage part and a center axis of the pocket hole part are displaced from each other as seen from the ejection port end side of the pocket hole part.

The invention according to claim 2 is to further solve the above problem by an aerostatic bearing made of a single base material and configured to support an object to be supported in a non-contact state by ejecting a gas, the aerostatic bearing including the gas restriction structure configured to eject the gas according to claim 1, wherein in the gas restriction structure, the ejection port end of the pocket hole part is flush with a bearing surface facing the object to be supported.

The invention according to claim 3 is to further solve the above problem by an aerostatic bearing made of a single base material and configured to support an object to be supported in a non-contact state by ejecting a gas, wherein a plurality of the gas restriction structures configured to eject the gas according to claim 1 are arranged, in each of the gas restriction structures, the ejection port end of the pocket hole part is flush with a bearing surface facing the object to be supported, and the gas restriction structures are arranged adjacent to one another such that a movement direction of the object to be supported due to a gas ejected from one pocket hole part of the gas restriction structures arranged adjacent to one another is opposite to a movement direction of the object to be supported due to a gas ejected from another pocket hole part of the gas restriction structures arranged adjacent to one another.

The invention according to claim 4 is to further solve the above problem by an aerostatic bearing made of a single base material and configured to support an object to be supported in a non-contact state by ejecting a gas, wherein a plurality of the gas restriction structures configured to eject the gas according to claim 1 are arranged, in each of the gas restriction structures, the ejection port end of the pocket hole part is flush with a bearing surface facing the object to be supported, and the gas restriction structures are arranged such that a sum total of vectors in respective ejection directions of the gases ejected from the respective gas restriction structures amounts to zero.

Effects of Invention

In the gas restriction structure which constitutes an aerostatic bearing of the invention according to claim 1, a part of the pocket hole part and a part of the gas flow passage part overlap with each other as seen from the ejection port end side of the pocket hole part, and the center axis of the gas flow passage part and the center axis of the pocket hole part are displaced from each other as seen from the ejection port end side of the pocket hole part such that the overlapping portion between the gas flow passage part and the pocket hole part as seen from the ejection port end side of the pocket hole part forms a restrictor, whereby an area of the restrictor can be reduced more easily in comparison to a case in which the restrictor is manufactured by means of hole drilling, and further the feature in which the center axis of the gas flow passage part and the center axis of the pocket hole part are displaced from each other as seen from the ejection port end side of the pocket hole part allows the gas to be ejected obliquely from the ejection port end of the pocket hole part.

In the aerostatic bearing of the invention according to claim 2, the aerostatic bearing includes the gas restriction structure configured to eject the gas according to claim 1, wherein in the gas restriction structure, the ejection port end of the pocket hole part is flush with the bearing surface facing the object to be supported such that the overlapping portion between the gas flow passage part and the pocket hole part as seen from the ejection port end side of the pocket hole part forms a restrictor, whereby an area of the restrictor can be reduced more easily in comparison to a case in which the restrictor is manufactured by means of hole drilling, and further the feature in which the center axis of the gas flow passage part and the center axis of the pocket hole part are displaced from each other as seen from the ejection port end side of the pocket hole part and the gas ejected from the ejection port end of the pocket hole part is ejected obliquely with respect to the bearing surface allows for not only supporting an object to be supported in a non-contact state but also moving the object to be supported along the bearing surface.

In other words, the object to be supported can be supported in a non-contact state and moved along the bearing surface, while an area of the restrictor is reduced, a required flow rate of the air is decreased, and a rigidity is enhanced.

In the aerostatic bearing of the invention according to claim 3, a plurality of the gas restriction structures configured to eject the gas according to claim 1 are arranged, and in each of the gas restriction structures, the ejection port end of the pocket hole part is flush with the bearing surface facing the object to be supported such that the overlapping portion between the gas flow passage part and the pocket hole part as seen from the ejection port end side of the pocket hole part forms a restrictor, whereby an area of the restrictor can be reduced more easily in comparison to a case in which the restrictor is manufactured by means of hole drilling, and further the feature in which the gas restriction structures are arranged adjacent to one another such that a movement direction of the object to be supported due to a gas ejected from one pocket hole part of the gas restriction structures arranged adjacent to one another is opposite to a movement direction of the object to be supported due to a gas ejected from another pocket hole part of the gas restriction structures arranged adjacent to one another allows movements of the object to be supported relative to the aerostatic bearing to be cancelled out, so that the object to be supported can be supported at a fixed position relative to the aerostatic bearing in a non-contact state.

In other words, the object to be supported can be supported at a fixed position relative to the aerostatic bearing in a non-contact state, while an area of the restrictor is reduced, a required flow rate of the air is decreased, and a rigidity is enhanced.

In the aerostatic bearing of the invention according to claim 4, a plurality of the gas restriction structures configured to eject the gas according to claim 1 are arranged, and in each of the gas restriction structures, the ejection port end of the pocket hole part is flush with the bearing surface facing the object to be supported such that the overlapping portion between the gas flow passage part and the pocket hole part as seen from the ejection port end side of the pocket hole part forms a restrictor, whereby an area of the restrictor can be reduced more easily in comparison to a case in which the restrictor is manufactured by means of hole drilling, and further the feature in which the gas restriction structures are arranged such that a sum total of vectors in respective ejection directions of the gases ejected from the respective gas restriction structures amounts to zero, so that the object to be supported can be supported at a fixed position relative to the aerostatic bearing in a non-contact state.

In other words, the object to be supported can be supported at a fixed position relative to the aerostatic bearing in a non-contact state, while an area of the restrictor is reduced, a required flow rate of the air is decreased, and a rigidity is enhanced.

DESCRIPTION OF EMBODIMENTS

The present invention may be specifically embodied in any manner as long as a gas restriction structure which constitutes an aerostatic bearing made of a single base material and configured to support an object to be supported in a non-contact state by ejecting a gas comprises: a gas flow passage part configured to communicate with a gas supply source for supplying the gas; and a pocket hole part in which an ejection port end configured to communicate with an outlet end of the gas flow passage part faces the object to be supported, wherein a part of the pocket hole part and a part of the gas flow passage part overlap with each other as seen from an ejection port end side of the pocket hole part, and a center axis of the gas flow passage part and a center axis of the pocket hole part are displaced from each other as seen from the ejection port end side of the pocket hole part such that the gas is ejected obliquely from the ejection port end side of the pocket hole part, while an area of a restrictor is reduced.

For example, the gas in the present invention may be any gas, but is preferably the air.

For example, as long as the gas restriction structure according to the present invention is made of a single base material, a material thereof may be any material, such as a resin, a metal, and ceramics.

Note that it is needless to say that the "single base material" herein may be made of one type of materials or may be a member such that a plurality of types of materials are tightly layered with one another so as to prevent the gas from leaking between layers.

For example, the cross section of the gas flow passage part and the cross section of the pocket hole part of the gas restriction structure according to the present invention may have any shape as long as the restrictor as seen from the ejection port end side of the pocket hole part is formed.

Note that the restrictor may also have any shape.

Further, with respect to a magnitude relationship between a cross-sectional area of the gas flow passage part and a cross-sectional area of the pocket hole part of the gas restriction structure according to the present invention, the cross-sectional area of the pocket hole part is preferably less than or equal to the cross-sectional area of the gas flow passage part but the cross-sectional area of the pocket hole part may be greater than the cross-sectional area of the gas flow passage part, as long as the restrictor as seen from the ejection port end side of the pocket hole part is formed.

For example, the pocket hole part of the gas restriction structure according to the present invention may have any depth such that a self-excited vibration (the pneumatic hammer) does not occur.

For example, the aerostatic bearing in which the gas restriction structure is integrated according to the present invention may be a thrust bearing to support a load from a rotational body which is an object to be supported in an axial direction, a journal bearing to support a load from a rotational body which is an object to be supported in a radial direction or a guide (slider) to allow and support a linear motion of an object to be supported.

In other words, an object to be supported by the aerostatic bearing and a direction of motion thereof are not particularly limited.

Embodiment 1

Hereinafter, an aerostatic bearing 100 provided with a gas restriction structure according to an embodiment of the present invention will be described with reference to FIG. 1 to 4B.

Figure 1:
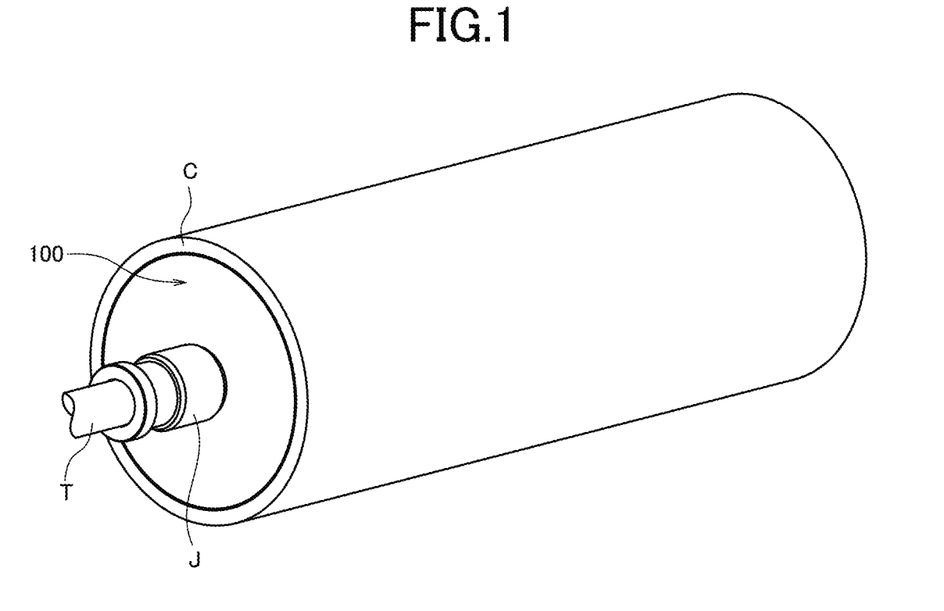
FIG. 1 is a perspective view of an aerostatic bearing according to an embodiment of the present invention.
Figure 2:
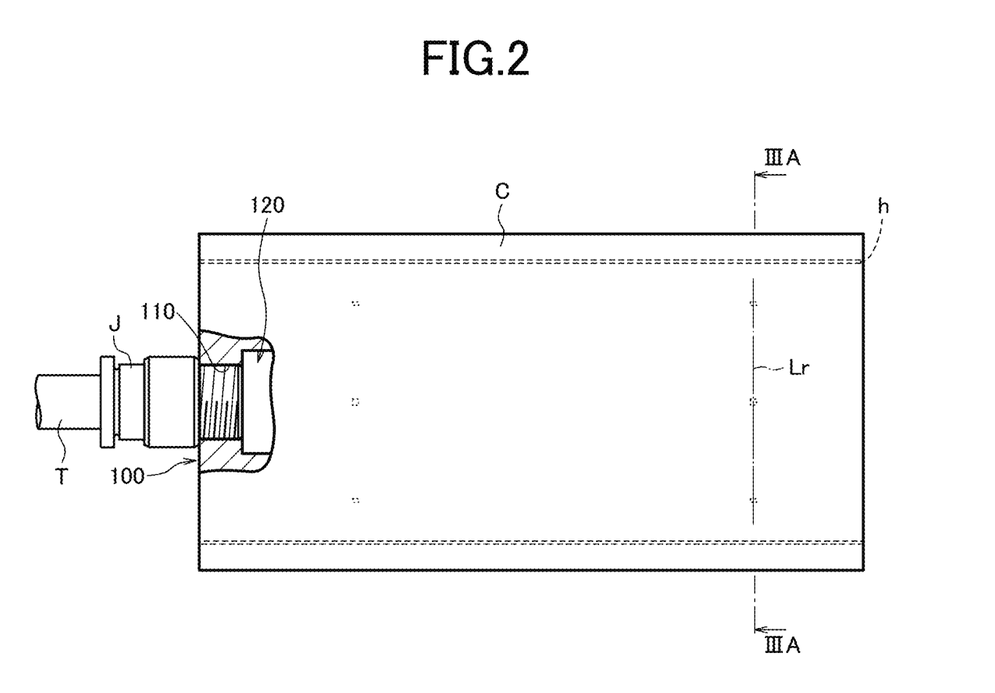
FIG. 2 is a side view of the aerostatic bearing in FIG. 1.
Figure 3A:
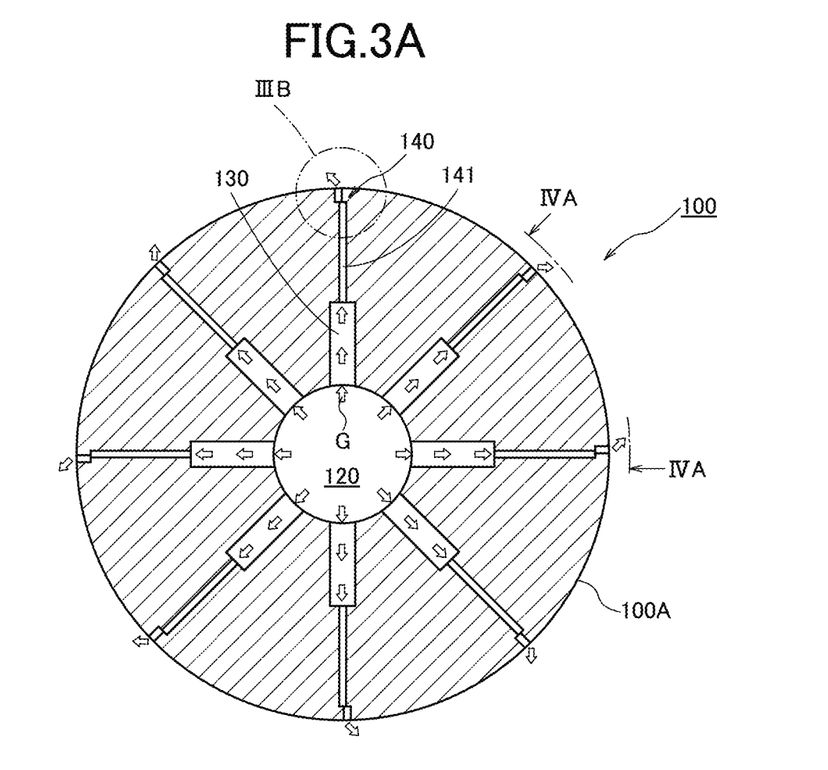
FIG. 3A is a cross-sectional view taken along section line IIIA-IIIA of FIG. 2, illustrating a cross-sectional structure of the aerostatic bearing.
Figure 3B:
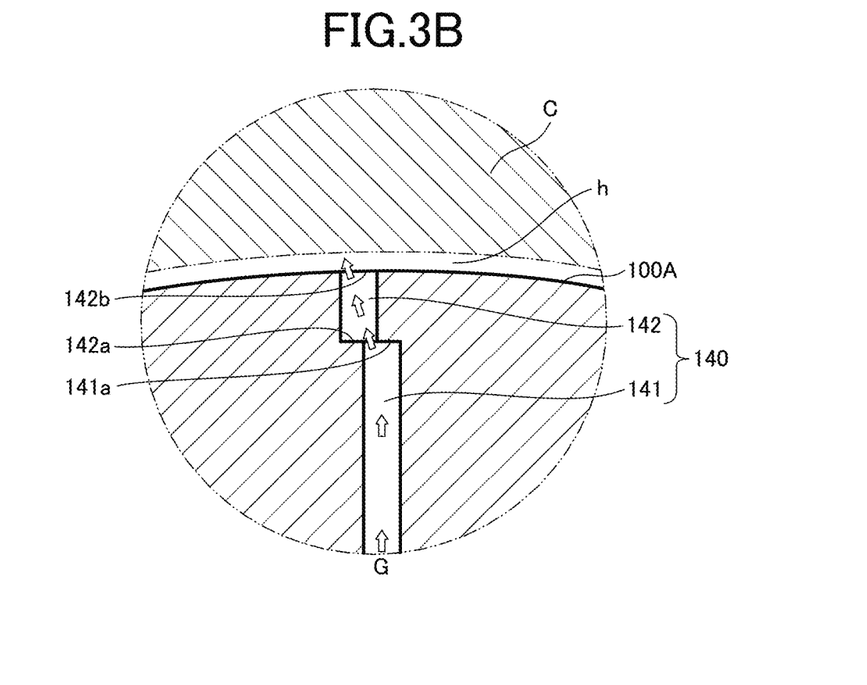
FIG. 3B is an enlarged view of portion IIIB of FIG. 3A.
Figure 4A:
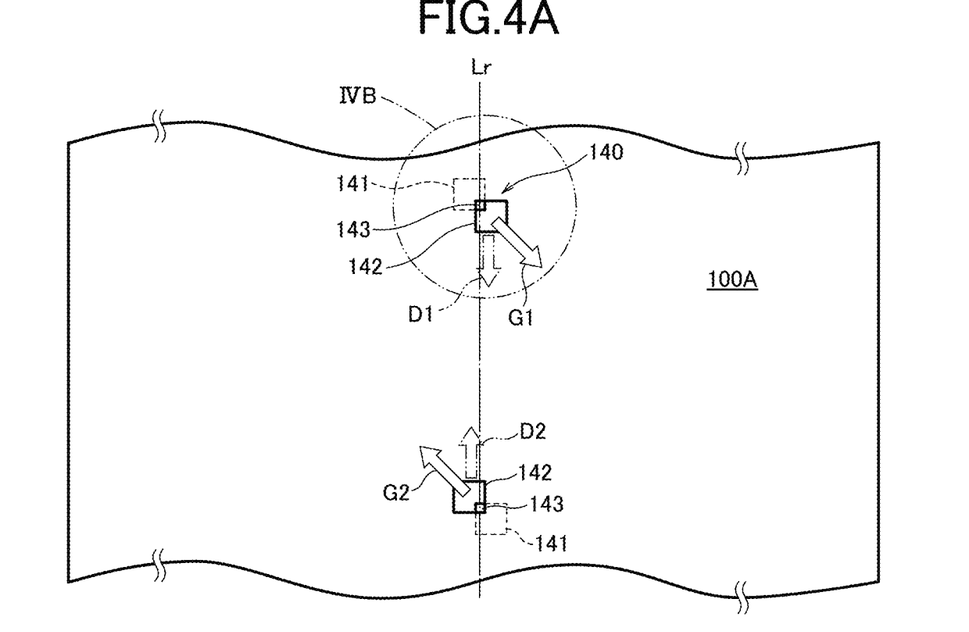
FIG. 4A is an enlarged view of an essential part of a gas restriction member as seen from IVA of FIG. 3A.
Figure 4B:
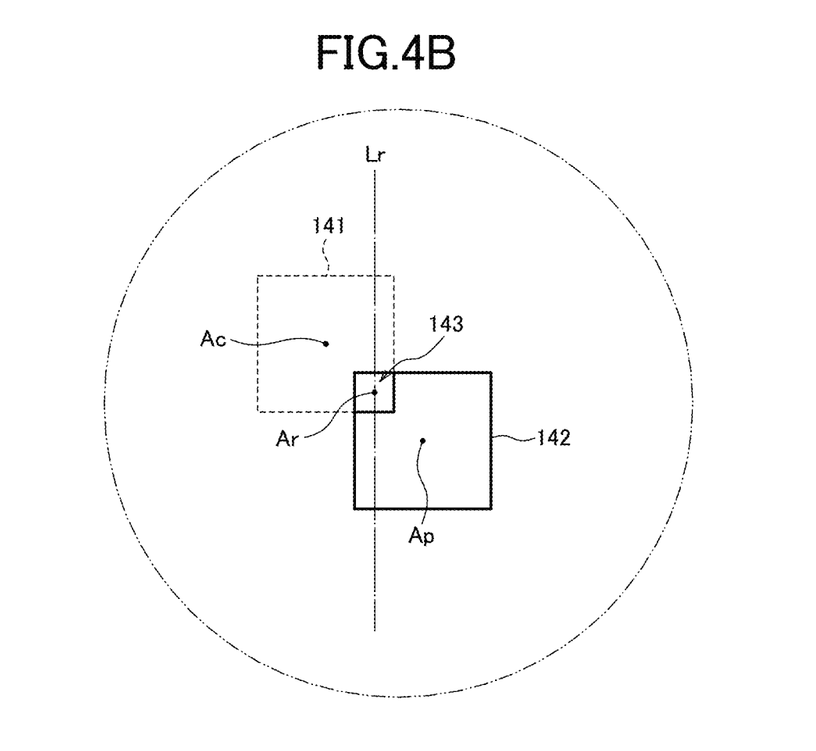
FIG. 4B is an enlarged view of portion IVB of FIG. 4A.

FIG. 1 is a perspective view of an aerostatic bearing according to an embodiment of the present invention, FIG. 2 is a side view of the aerostatic bearing in FIG. 1, FIG. 3A is a cross-sectional view taken along section line IIIA-IIIA of FIG. 2, illustrating a cross-sectional structure of the aerostatic bearing, FIG. 3B is an enlarged view of portion IIIB of FIG. 3A, FIG. 4A is an enlarged view of an essential part of a gas restriction member as seen from IVA of FIG. 3A, and FIG. 4B is an enlarged view of portion IVB of FIG. 4A.

As illustrated in FIGS. 1 and 2, the aerostatic bearing 100 is a bearing having a hollow cylinder shape and made of a single resin, and supports a cylindrical collar C which is an object to be supported in a manner separated therebetween by a bearing gap h in a non-contact state using compressed air (gas).

In other words, the aerostatic bearing 100 in the present embodiment is a journal bearing to support a load from the collar C in a radial direction.

As illustrated in FIG. 2, one end face of this aerostatic bearing 100 is provided with a female threaded hole 110.

Note that the other end face of the aerostatic bearing 100 is closed.

An end of the female threaded hole 110 communicates with a cylindrical gas reservoir region 120 which extends in a longitudinal direction.

Further, as illustrated in FIGS. 1 and 2, a coupling J configured to be connected to an air pipe T connected to an unillustrated gas supply source is threaded in this female threaded hole 110.

Next, as illustrated in FIG. 3A, the aerostatic bearing 100 is provided with eight gas introduction passages 130 which radially extend from the gas reservoir region 120.

The gas introduction passages 130 each communicate with a corresponding gas restriction structure 140 which ejects a compressed air G for supporting the collar C in a non-contact state.

In the present embodiment, the eight gas restriction structures 140 are arranged.

Then, as illustrated in FIG. 3B, this gas restriction structure 140 includes a gas flow passage part 141 and a pocket hole part 142.

The gas flow passage part 141 has a rectangular shape as seen in plan view as illustrated in FIGS. 4A and 4B and communicates with the gas introduction passage 130 as illustrated in FIG. 3A.

In other words, the gas flow passage part 141 communicates through the gas introduction passage 130 with the gas supply source.

The pocket hole part 142 has a rectangular shape as seen in plan view as illustrated in FIGS. 4A and 4B and an injection port end 142a of the pocket hole part 142 communicates with an outlet end 141a of the gas flow passage part 141 as illustrated in FIG. 3B.

Further, an ejection port end 142b of the pocket hole part 142 is flush with a bearing surface 100A of the aerostatic bearing 100 and faces the collar C.

As illustrated in FIG. 4B, a center axis Ac of the gas flow passage part 141 and a center axis Ap of the pocket hole part 142 of the gas restriction structure 140 are arranged on respective sides of a line Lr.

Then, a part of the gas flow passage part 141 and a part of the pocket hole part 142 overlap with each other as seen from a bearing surface A side such that this overlapping portion forms a restrictor 143.

In other words, the center axis Ac of the gas flow passage part 141, a center axis Ar of the restrictor 143, and the center axis Ap of the pocket hole part 142 are displaced from one another as seen from the bearing surface 100A side.

As illustrated in FIGS. 2, 4A, and 4B, the gas restriction structures 140 adjacent to one another in a circumferential direction are each positioned on the line Lr at which the center axis Ar of the restrictor 143 is orthogonal to a center axis of the aerostatic bearing 100 as seen from the side.

Then, the corresponding center axes Ac of the gas flow passage parts 141 of the gas restriction structures 140 adjacent to one another in the circumferential direction and the corresponding center axes Ap of the pocket hole parts 142 of the gas restriction structures 140 adjacent to one another in the circumferential direction are respectively arranged such that the line Lr is positioned therebetween.

Further, as illustrated in FIG. 4A, the corresponding pocket hole parts 142 of the gas restriction structures 140 adjacent to one another in the circumferential direction are adjacent to one another.

Next, the flow of the compressed air G in the aerostatic bearing 100 as described above will be described with reference to FIGS. 2, 3A, and 4A.

The compressed air G supplied from the gas supply source flows through the air pipe T, then via the coupling J, and into the gas reservoir region 120 of the aerostatic bearing 100.

Then, as illustrated in FIG. 3A, the compressed air G flows through the gas introduction passage 130 and enters the gas restriction structure 140.

The compressed air G flowing into the gas restriction structure 140 is restricted at the restrictor 143, thereby flowing into the pocket hole part 142 in a pressurized state, thus flowing from the pocket hole part 142 into the bearing gap h.

In this case, the center axis Ac of the gas flow passage part 141, the center axis Ar of the restrictor 143, and the center axis Ap of the pocket hole part 142 are displaced from one another as seen from the bearing surface 100A side so that, as illustrated in FIGS. 3B and 4A, the compressed air G ejected from the ejection port end 142b of the pocket hole part 142 is ejected from the gas flow passage part 141 toward the pocket hole part 142, i.e., obliquely with respect to the bearing surface 100A.

Then, the corresponding gas flow passage parts 141 and the corresponding pocket hole parts 142 of the gas restriction structures 140 adjacent to one another in the circumferential direction are respectively arranged differently with respect to the line Lr so that, as illustrated in FIG. 4A, corresponding directions (G1, G2) of the compressed air ejected from the gas restriction structures 140 adjacent to one another in the circumferential direction are opposite to each other.

In the gas restriction structure 140 according to the present embodiment as described above, a part of the gas flow passage part 141 and a part of the pocket hole part 142 overlap with each other as seen from an ejection port end 142b side of the pocket hole part 142 and the center axis Ac of the gas flow passage part 141, the center axis Ar of the restrictor 143, and the center axis Ap of the pocket hole part 142 are displaced from one another as seen from the ejection port end 142b side of the pocket hole part 142, thereby not only being capable of reducing an area of the restrictor 143 more easily in comparison to a case in which the restrictor 143 is manufactured by means of hole drilling but also being capable of ejecting the compressed air G obliquely from the ejection port end 142b of the pocket hole part 142.

Further, in the aerostatic bearing 100 according to the present embodiment, a plurality of the gas restriction structures 140 are arranged, and the gas restriction structures 140 are arranged adjacent to one another such that a movement direction D1 of the collar C which is the object to be supported due to a compressed air G1 ejected from one pocket hole part 142 of the gas restriction structures 140 arranged adjacent to one another in the circumferential direction is opposite to a movement direction D2 of the object to be supported due to a compressed air G2 ejected from another pocket hole part 142 of the gas restriction structures 140 arranged adjacent to one another in the circumferential direction, thereby being capable of supporting the collar C at a fixed position relative to the aerostatic bearing 100 in a non-contact state.

<Variants>

Although the aerostatic bearing 100 according to an embodiment of the present invention has been described above, the aerostatic bearing according to the present invention is not to be limited to the aerostatic bearing 100 according to the above embodiment.

For example, although in the above embodiment, for the aerostatic bearing 100, two sets of the eight gas restriction structures 140 in the circumferential direction at equal intervals are provided in the longitudinal direction, an arrangement of the gas restriction structures is not limited to such a configuration and any arrangement may be employed depending upon a bearing shape or an object to be supported.

For example, although in the above embodiment, a plurality of the gas restriction structures 140 are arranged, and the gas restriction structures 140 are arranged adjacent to one another such that a movement direction D1 of the collar C which is the object to be supported due to a compressed air G1 ejected from one pocket hole part 142 of the gas restriction structures 140 arranged adjacent to one another in the circumferential direction is opposite to a movement direction D2 of the object to be supported due to a compressed air G2 ejected from another pocket hole part 142 of the gas restriction structures 140 arranged adjacent to one another in the circumferential direction, an arrangement of the gas restriction structures in the aerostatic bearing is not limited to such a configuration.

Specifically, it is also possible that a plurality of the gas restriction structures are arranged and the gas restriction structures are arranged such that a sum total of vectors in respective ejection directions of the gases ejected from the respective gas restriction structures amounts to zero.

Such an arrangement of the gas restriction structures allows movements of an object to be supported relative to the aerostatic bearing provided with the gas restriction structures to be cancelled out, so that the object to be supported can be supported at a fixed position relative to the aerostatic bearing in a non-contact state.

In other words, the object to be supported can be supported at a fixed position relative to the aerostatic bearing in a non-contact state, while an area of the restrictor is reduced, a required flow rate of the air is decreased, and a rigidity is enhanced.

For example, although in the above embodiment, the aerostatic bearing 100 is provided with the eight gas restriction structures 140, the number of gas restriction structures constituting the aerostatic bearing is not limited by such a configuration, and any number of gas restriction structures may be suitable depending upon a bearing shape or an object to be supported.

Figure 5A:
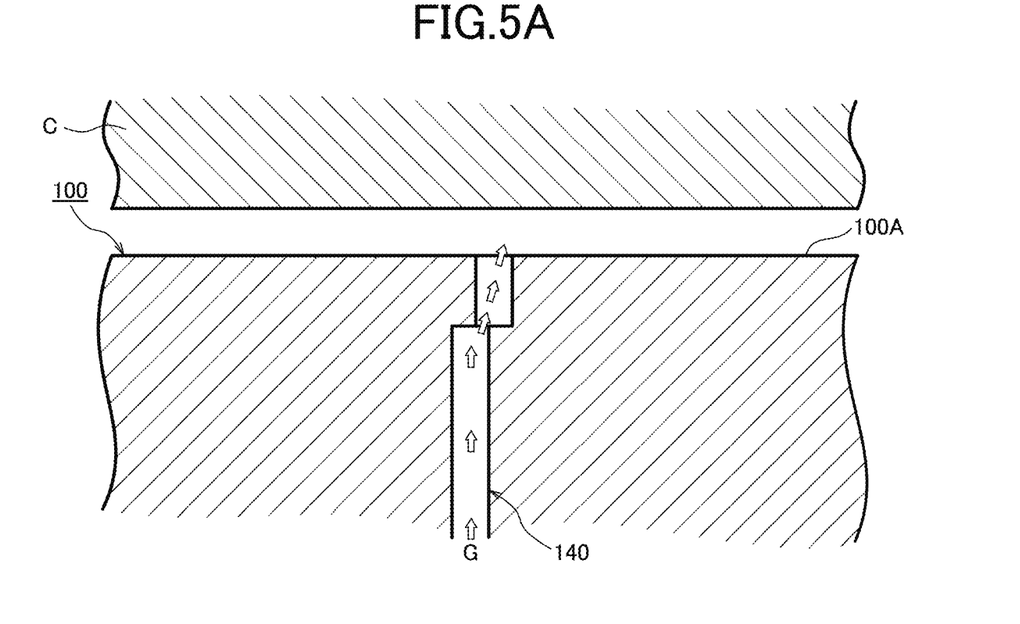
FIG. 5A is a cross-sectional view illustrating a first variant of the aerostatic bearing according to the present invention.

For example, as illustrated in FIG. 5A which is a cross-sectional view illustrating the aerostatic bearing according to a first variant of the present invention, only the single gas restriction structure 140 may be provided and, in this case, the center axis of the gas flow passage part, the center axis of the restrictor, and the center axis of the pocket hole part are displaced from one another as seen from the bearing surface side and a gas ejected from the ejection port end of the pocket hole part is ejected obliquely with respect to the bearing surface, thereby being capable of not only supporting an object to be supported in a non-contact state but also moving the object to be supported along the bearing surface.

In other words, the object to be supported can be supported in a non-contact state and moved along the bearing surface, while an area of the restrictor is reduced, a required flow rate of the air is decreased, and a rigidity is enhanced.

For example, although in the above embodiment, each of the gas restriction structures 140 adjacent to one another in the circumferential direction has the center axis Ar of the restrictor 143 which is positioned on the line Lr orthogonal to the center axis of the aerostatic bearing 100 as seen in plan view, it is also possible that each of the gas restriction structures 140 adjacent to one another in the circumferential direction has the center axis Ar of the restrictor 143 which is not positioned on the line Lr orthogonal to the center axis of the aerostatic bearing 100 as seen in plan view.

Further, as long as a part of the gas flow passage part and a part of the pocket hole part overlap with each other as seen from the bearing surface side, any arrangement relationship between the center axis of the gas passage part as well as the center axis of the pocket hole part and the line Lr may be employed.

Figure 5B:
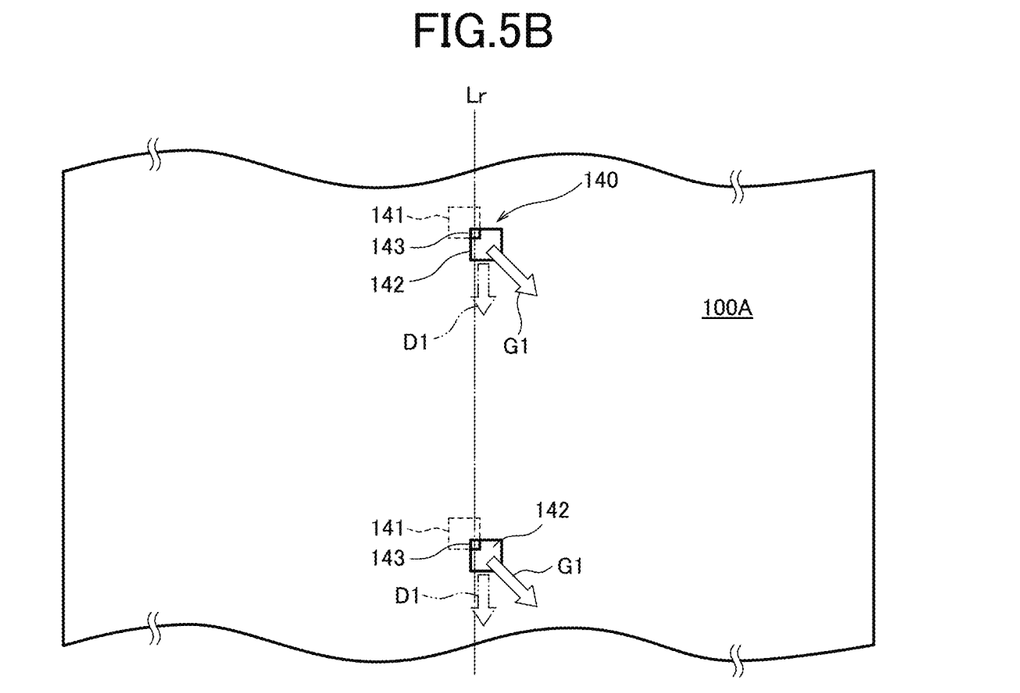
FIG. 5B is a side development view illustrating a second variant of the aerostatic bearing according to the present invention.

For example, although in the above embodiment, the gas restriction structures 140 adjacent to one another in the circumferential direction have the respective pocket hole parts 142 which are adjacent to one another, it is also possible that the gas restriction structures 140 adjacent to one another in the circumferential direction have the respective gas flow passage parts 141 and pocket hole parts 142 which are adjacent to each other as illustrated in FIG. 5B which is a cross-sectional view illustrating the aerostatic bearing according to a second variant of the present invention.

Also in this case, similarly to the aerostatic bearing provided with the single gas restriction structure 140, gases ejected from the corresponding ejection port ends of the respective pocket hole parts are ejected obliquely with respect to the bearing surface, thereby being capable of not only supporting an object to be supported in a non-contact state but also moving the object to be supported along the bearing surface.

REFERENCE SIGNS LIST 100 aerostatic bearing
100A bearing surface
110 female threaded hole
120 gas reservoir region
130 gas introduction passage
140 gas restriction structure
141 gas flow passage part
141a outlet end
142 pocket hole part
142a injection port end
142b ejection port end
143 restrictor
J coupling
T air pipe
C collar (object to be supported)
h bearing gap
G compressed air (gas)
Ac center axis of gas flow passage part
Ar center axis of restrictor
Ap center axis of pocket hole part

The invention claimed is:

1. A gas restriction structure which constitutes an aerostatic bearing made of a single base material and configured to support an object to be supported in a non-contact state by ejecting a gas, the gas restriction structure comprising:
   a gas flow passage part configured to communicate with a gas supply source for supplying the gas; and
   a pocket hole part in which an ejection port end configured to communicate with an outlet end of the gas flow passage part faces the object to be supported,
   wherein:
   a part of the pocket hole part and a part of the gas flow passage part overlap with each other as seen from an ejection port end side of the pocket hole part, and
   a center axis of the gas flow passage part and a center axis of the pocket hole part are displaced from each other as seen from the ejection port end side of the pocket hole part.

2. An aerostatic bearing made of a single base material and configured to support an object to be supported in a non-contact state by ejecting a gas, the aerostatic bearing comprising:
   the gas restriction structure of claim 1,
   wherein in the gas restriction structure, the ejection port end of the pocket hole part is flush with a bearing surface facing the object to be supported.

3. An aerostatic bearing made of a single base material and configured to support an object to be supported in a non-contact state by ejecting a gas, wherein:
   a plurality of gas restriction structures each comprising the gas restriction structure of claim 1 are arranged,
   in each of the gas restriction structures, the ejection port end of the pocket hole part is flush with a bearing surface facing the object to be supported, and
   the gas restriction structures are arranged adjacent to one another such that a movement direction of the object to be supported due to a gas ejected from one pocket hole part of the gas restriction structures arranged adjacent to one another is opposite to a movement direction of the object to be supported due to a gas ejected from another pocket hole part of the gas restriction structures arranged adjacent to one another.

4. An aerostatic bearing made of a single base material and configured to support an object to be supported in a non-contact state by ejecting a gas, wherein:
   a plurality of gas restriction structures each comprising the gas restriction structure of claim 1 are arranged,
   in each of the gas restriction structures, the ejection port end of the pocket hole part is flush with a bearing surface facing the object to be supported, and
   the gas restriction structures are arranged such that a sum total of vectors in respective ejection directions of the gases ejected from the respective gas restriction structures amounts to zero.

* * * * *